(12) United States Patent
Hofbauer et al.

(10) Patent No.: US 7,395,178 B2
(45) Date of Patent: Jul. 1, 2008

(54) MEASURING SYSTEM AND METHOD FOR THE FUNCTIONAL MONITORING THEREOF

(75) Inventors: Hermann Hofbauer, Trostberg (DE); Erich Strasser, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/825,238

(22) Filed: Jul. 5, 2007

(65) Prior Publication Data

US 2007/0255523 A1 Nov. 1, 2007

Related U.S. Application Data

(62) Division of application No. 10/529,421, filed as application No. PCT/EP03/09796 on Sep. 4, 2003, now Pat. No. 7,295,946.

(30) Foreign Application Priority Data

Sep. 25, 2002 (DE) .................................. 102 44 583

(51) Int. Cl.
  *G01C 9/00* (2006.01)
  *G06F 19/00* (2006.01)
(52) U.S. Cl. ...................................................... 702/150
(58) Field of Classification Search .................. 702/150
  See application file for complete search history.

(56) References Cited

U.S. PATENT DOCUMENTS

| | | | |
|---|---|---|---|
| 5,687,103 A * | 11/1997 | Hagl et al. ................... 702/150 |
| 5,956,659 A | 9/1999 | Spies et al. | |
| 6,008,637 A | 12/1999 | Corbier | |
| 6,114,947 A * | 9/2000 | Tondorf ....................... 348/135 |
| 6,480,797 B1 * | 11/2002 | Fritz et al. ................... 702/107 |
| 2004/0088136 A1 * | 5/2004 | Ashe ........................... 702/150 |
| 2004/0133373 A1 | 7/2004 | Braasch et al. | |
| 2006/0052973 A1 * | 3/2006 | Hiller ........................... 702/150 |
| 2006/0100812 A1 * | 5/2006 | Sturges et al. ............... 702/117 |
| 2006/0245484 A1 * | 11/2006 | Calvin et al. ................ 375/227 |

FOREIGN PATENT DOCUMENTS

| | | |
|---|---|---|
| DE | 36 31 429 | 3/1988 |
| DE | 38 29 815 | 3/1990 |
| DE | 195 08 834 | 9/1996 |
| DE | 197 12 622 | 10/1998 |
| DE | 100 50 392 | 4/2002 |
| EP | 0 800 059 | 10/1997 |
| EP | 0 857 949 | 8/1998 |

* cited by examiner

*Primary Examiner*—John E. Barlow, Jr.
*Assistant Examiner*—Cindy H Khuu
(74) *Attorney, Agent, or Firm*—Kenyon & Kenyon LLP

(57) ABSTRACT

A measuring system includes a measuring device, another device and a device configured to transmit data enabling bits of data to be transmitted between the measuring device and the other device. The measuring device also includes a signal monitoring circuit and a switch element. The switch element is electrically contacted to a test potential source. The test potential source is in contact with the signal monitoring circuit according to a switch element state. The signal monitoring circuit is also in contact with the device for transmitting date. A method provides for functional monitoring of such a measuring system in a monitoring mode when a test potential is applied.

6 Claims, 4 Drawing Sheets

MEASURING SYSTEM AND METHOD FOR THE FUNCTIONAL MONITORING THEREOF

CROSS-REFERENCE TO RELATED APPLICATION

This application is a divisional of, and incorporates herein by reference in its entirety, prior application Ser. No. 10/529,421 which was filed on Mar. 25, 2005 now U.S. Pat. No. 7,295,946, which was a National Stage Application of PCT International Application No. PCT/EP03/09796, which was filed on Sep. 4, 2003.

FIELD OF THE INVENTION

The present invention relates to a measuring system, e.g., a position-measuring system, the functioning of which may be simple to test. The present invention is also directed to a method for testing for correct functioning.

BACKGROUND INFORMATION

In position-measuring systems, position sensors in a measuring device generate electrical signals, which provide information on the position of objects which are moving in relation to one another. The present invention relates to measuring systems that use measuring devices which produce comparatively precise, incremental positional information, as well as relatively rough positional information. These two types of positional data may be of particular importance for controlling the electric drives used in moving the axes of a processing machine, such as of a machine tool or robot. In such applications, the precise, incremental, positional information may be used to precisely determine positions, for example, of a tool of a machine tool.

Such electric drives may be arranged as rotary electromotors, for which rotary transducers may be used to perform angle-of-rotation measurements. Example embodiments of the present invention may also be used in connection with the operation of linear motors.

Rotary transducers may enable angular position measurements to be taken on a rotatable shaft in incremental measuring steps. However, so-called absolute-value encoders, also described as rotary, shaft-angle or incremental encoders, are also conventional. These permit an absolute angular determination to be made within one single shaft rotation. Moreover, if the need arises to determine the number of completed shaft rotations, then so-called multiturn rotary encoders may be used. Such multiturn rotary encoders determine the absolute angular position within one shaft rotation, i.e., between 0° and 360°, using an encoder disk which is connected to the shaft and is scanned by a suitable photoelectric scanning unit. Thus, it is also possible to measure the absolute position of the driven shaft over a plurality of rotations.

The signals of these measuring devices may be used for controlling the processing machines. The term processing machine is not limited to machine tools, but also includes machines for populating electronic components or for machining semiconductor elements. Automation or programmable machines, such as robots, also fall under the processing-machine designation.

In conventional position-measuring systems, in addition to the digital positional data, analog position signals are also transmitted from the measuring device to the machine control, where these signals are then interpolated. Due to the advancing miniaturization of electronics, these interpolation processes are being increasingly carried out in a suitable electronic circuit within the measuring device itself, so that the analog position signals are not transmitted to the machine control. This may reduce the outlay for wiring, which may have a significant effect on the costs of a measuring system.

However, in safety-related machine applications under conventional methods, the digital positional data and the analog position signals are compared in the machine control in order to detect errors. However, since analog position signals may be missing in the machine control, it may no longer be possible for this comparison to be made.

Therefore, in measuring systems, in which no analog position signals arrive in the machine control for the mentioned reasons, besides the current, often absolute positional data, it may not be unusual for so-called static bits to be transmitted via a parallel or serial interface from the measuring device to the machine control. These static bits may be error bits, for example, which, in normal operation, always exhibit a specific level, and only in a (very rare) case of error, point to an error due to a change in level.

This manner of transmitting error information may be disadvantageous, e.g., in the case of safety-related monitoring, because it may not be ruled out that a defect may cause a constant level of an error bit to continually be output, thus that this defect does not permit a change in level even in the case of faults or malfunctions.

German Published Patent Application No. 38 29 815 of the assignee hereof describes a position-measuring device or position transducer, where a test for errors is initiated by an activation signal. However, the performance reliability of the monitoring electronics itself may not be checked. Moreover, the outlay entailed for signal transmission may be comparatively large.

SUMMARY

According to an example embodiment of the present invention, a measuring system is provided which may render possible a safe and reliable operation of processing machines, the outlay for signal transmission being comparatively low.

Moreover, according to an example embodiment of the present invention, a method for checking error information may significantly enhance the safety and reliability of processing machines.

A fault may be able to be induced, in a deliberate, controlled manner, in the measuring device during a test operation, and it is then checked by applying a test potential, whether an error bit having a corresponding level arrives in the machine control. Example embodiments of the present invention may enable the performance reliability of a monitoring electronics, e.g., of a signal-amplitude monitoring circuit to be checked. The test potential may be understood, for instance, to be the voltage of a test potential source or, in a simple case, the earth potential.

In an example embodiment of the present invention, the circuit states for connecting to the test potential source, e.g., automatically, are triggered by the machine control.

According to an example embodiment of the present invention, a measuring system includes: a measurement device; a second device; and a data-transmission device configured to transmit data bits between the measurement device and the second device. The measurement device includes a signal-monitor circuit and a control element, the control element in electrical contact with a test potential source. In a circuit-element state, the test potential source is in contact with the signal-monitor circuit and the signal-monitor circuit is in contact with the data-transmission device.

According to an example embodiment of the present invention, a method for testing a measuring system for correct functioning includes: in a normal operation of the measuring system, transmitting, by a measurement device to a second device via a data-transmission device, a bit having a constant level to signal a fault-free operation of the measuring device; and in a test operation of the measuring system: electrically contacting a signal-monitoring circuit of the measuring device with a test-potential source; and in the second device, checking whether the test operation effects a change in a level of the bit in relation to the level of the bit in the normal operation.

According to an example embodiment of the present invention, a measuring system includes: measuring means; second means; and data-transmitting means for transmitting data bits between the measuring means and the second means. The measuring means includes signal-monitoring circuit means and control element means, the control element means in electrical contact with a test potential source means. In a circuit-element state, the test potential source means is in contact with the signal-monitoring circuit means and the signal-monitoring circuit means is in contact with the data-transmitting means.

Further aspects and features of the measuring system and of a corresponding method, as well as details pertaining thereto, are described below with reference to the appended Figures.

DETAILED DESCRIPTION

Figure 1A:
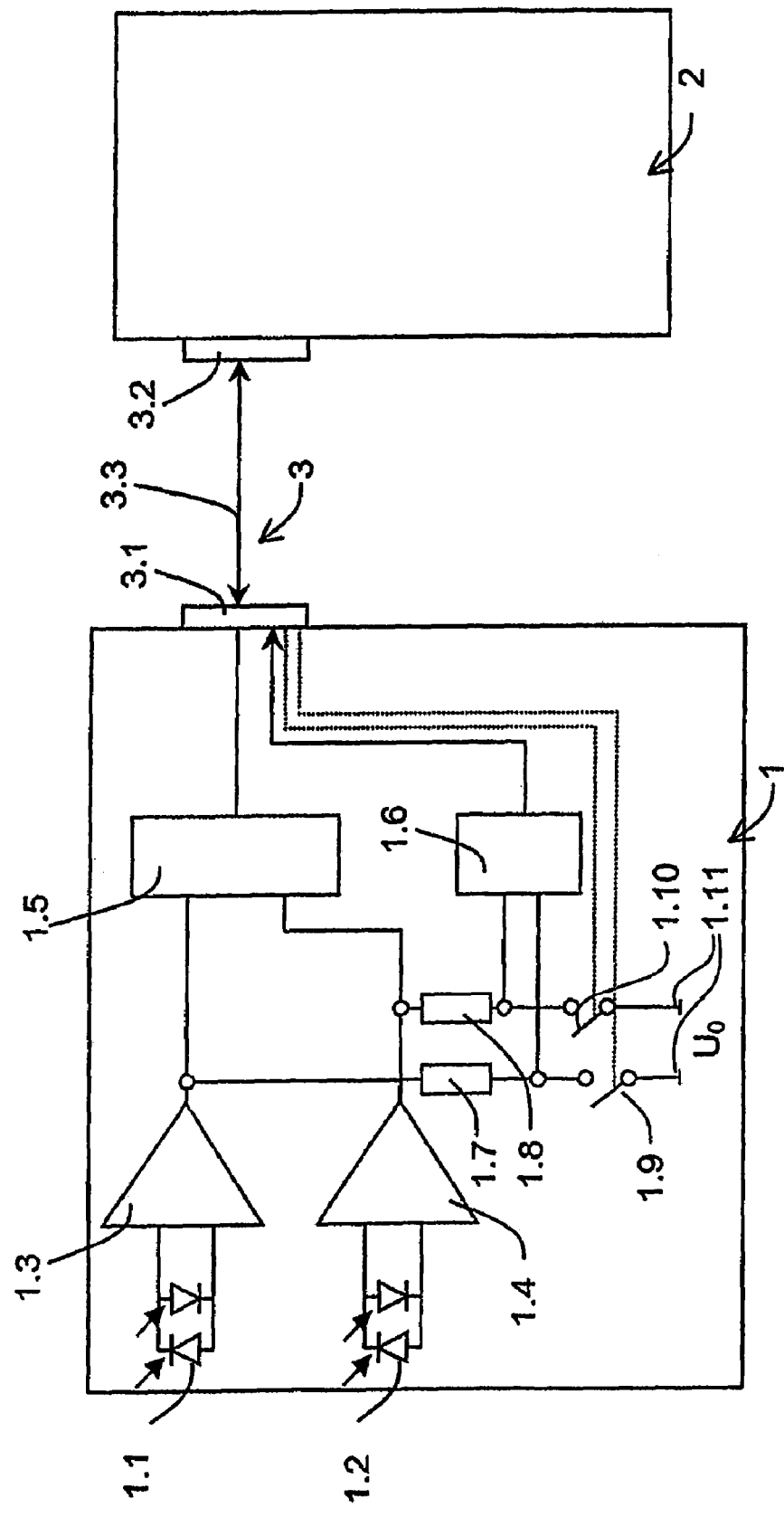
FIG. 1a is a schematic view of a measuring system according to an example embodiment of the present invention in normal operation.

In FIG. 1a, a measuring system is illustrated, which includes a rotary transducer 1, a machine control 2, and a data-transmission device 3.

Rotary transducer 1 has photoelements 1.1, 1.2, amplifiers 1.3, 1.4, an evaluation electronics 1.5, and a signal-amplitude monitoring circuit 1.6. Arranged at the lines between amplifiers 1.3, 1.4 and evaluation electronics 1.5, are branch lines having resistors 1.7, 1.8. Disposed above that in the circuit of rotary transducer 1 are control elements 1.9, 1.10, which electrically contact a test potential source 1.11.

Control elements 1.9, 1.10 may assume two control element states. In the first control element state, test potential source 1.11 is isolated from signal-amplitude monitoring circuit 1.6, and in the second control element state, an electrical contact is established between test potential source 1.11 and signal-amplitude monitoring circuit 1.6.

Data-transmission device 3 includes an interface socket 3.1 at rotary transducer 1, a multicore cable 3.3 having plug connectors, and an interface socket 3.1 at machine control 2. Alternatively thereto, a wireless data-transmission device 3 may also be provided. Correspondingly, suitable transmitter and receiver elements may be provided in place of interface sockets 3.1, 3.2.

Figure 2:
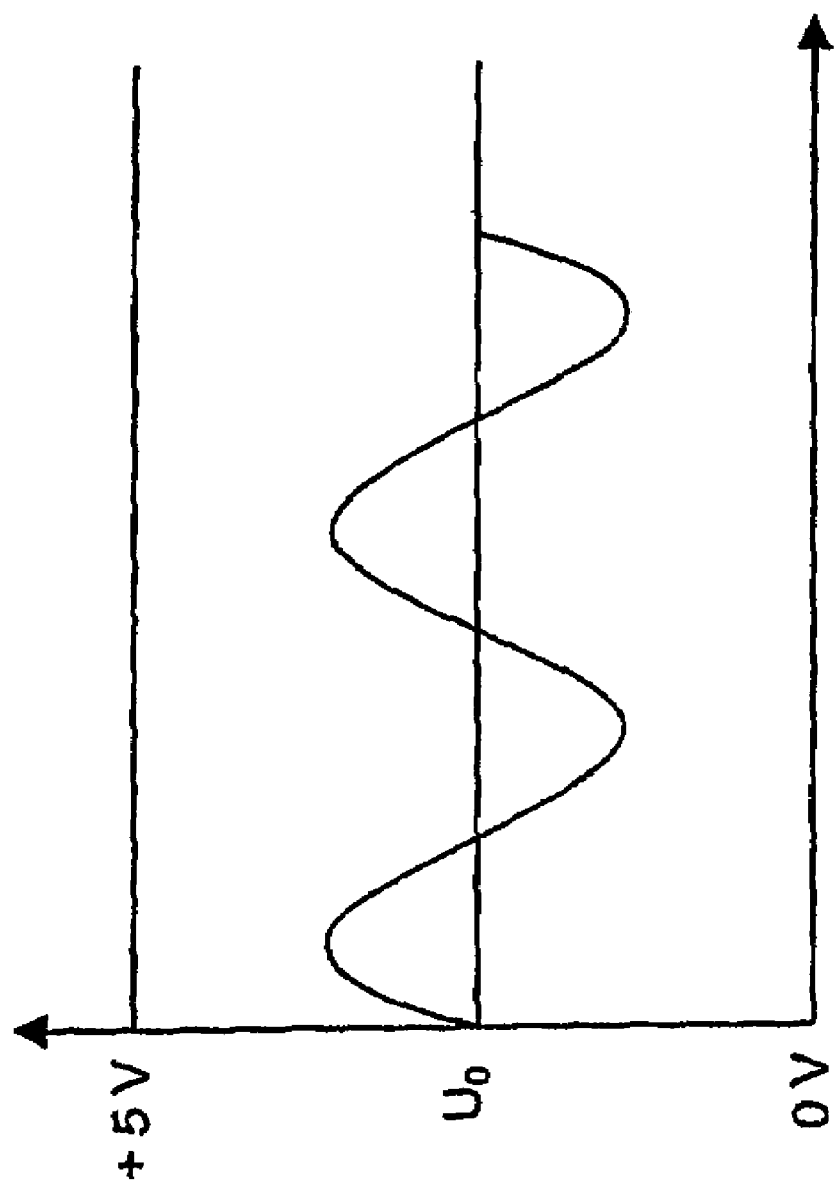
FIG. 2 is a voltage curve when a test voltage is used.

In accordance with the angular position of a shaft to be measured, light from an LED is modulated and converted by photoelements 1.1, 1.2 into photoelectric currents. These photoelectric currents are amplified with the aid of amplifiers 1.3, 1.4, so that the result is analog position signals, which have a sinusoidal form, as in accordance with FIG. 2. These position signals are fed in evaluation electronics 1.5, inter alia, to an interpolation process, thereby enabling the angular or positional resolution of measuring device 1 to be greatly increased. Moreover, in evaluation electronics 1.5, absolute digital positional values are generated, which, in the illustrated example, are transferred as a data packet, which includes a multiplicity of data bits, serially via interfaces 3.1, 3.2 and cable 3.3 to the machine control in a cycle time of 50 μs.

In parallel thereto, the analog position signals are fed to a signal-amplitude monitoring circuit 1.6. It is checked in this signal-amplitude monitoring circuit 1.6 whether the amplitudes of the analog position signals are within plausible limits. In normal operation, this criterion is met by the analog position signals, so that the same data packet used to transmit the absolute digital positional values to machine control 2 is also used to transmit an error bit, whose level signals or indicates the normal state, i.e., the fault-free operation of the measuring system. Thus, this error bit is typically transmitted at a constant level, in the exemplary embodiment presented here, every 50 μs, from measuring device 1 to machine control 2 and is, therefore, described as a static error bit.

As soon as the amplitudes of the analog position signals are outside of the plausible limits, the level of the error bit is changed, and the corresponding error bit is transmitted to machine control 2 via the next data packet. In reaction thereto, machine control 2 triggers an emergency shutoff for the entire machine.

The situation may also arise, however, where the level of the error bit is not able to be changed, for example, due to a short circuit. Then, in spite of a fault, the same error bit level is relayed to machine control 2, with the result that the machine would not be shut down, even in response to a fault.

Figure 1B:
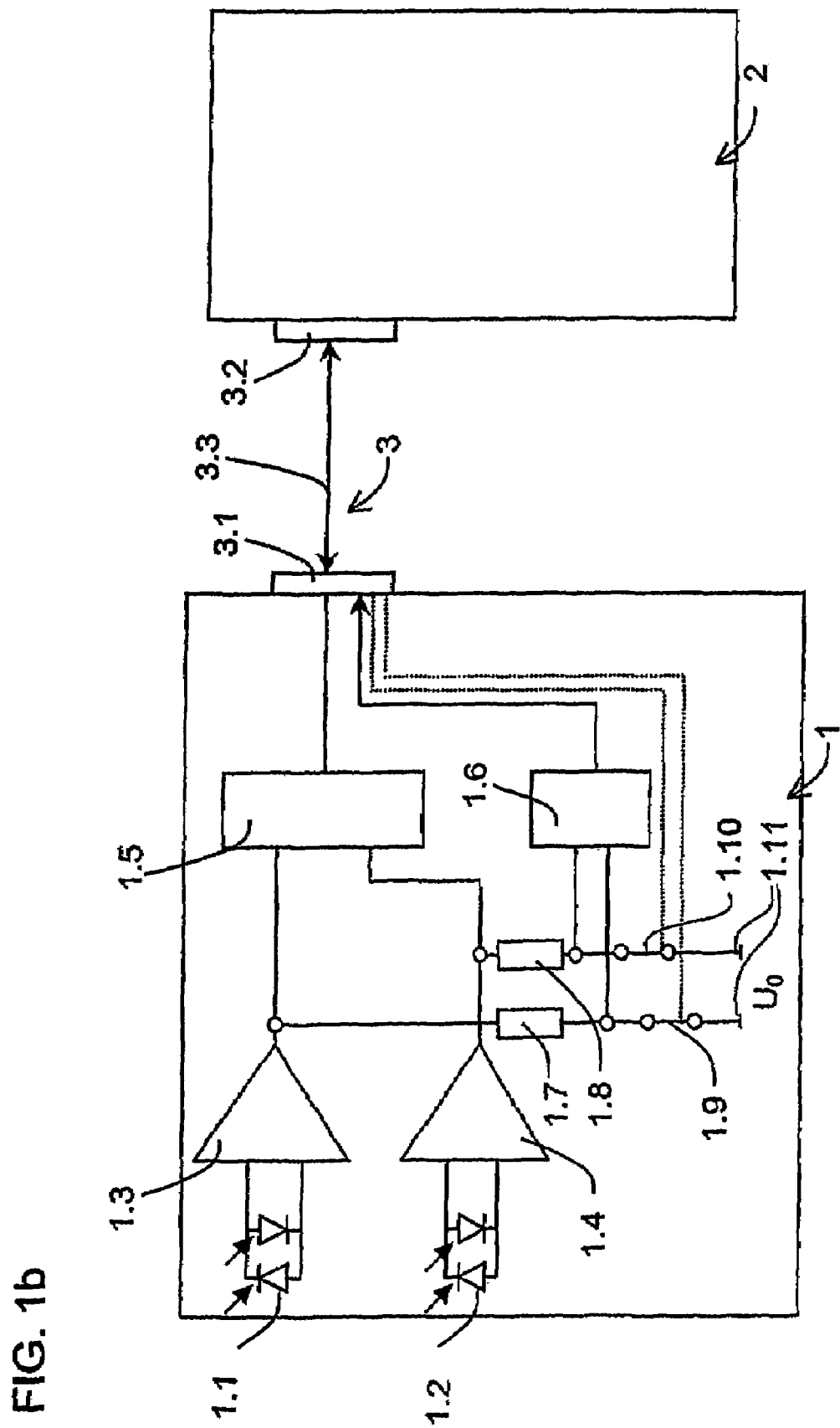
FIG. 1b is a schematic view of a measuring system according to an example embodiment of the present invention in test operation.

To avoid such a danger, a test operation is carried out for a short duration using a control element state, as illustrated in accordance with FIG. 1b. For this purpose, a signal is dispatched by machine control 2 to the measuring device. The signal is transmitted in the form of a code word, or mode command, by machine control 2 via a data line of cable 3.3 to rotary transducer 1. The data line of cable 3.3 is used both for transmitting the mode commands from machine control 2 to rotary transducer 1, as well as for transmitting data and signals, including the error bit, from rotary transducer 1 to machine control 2. Thus, as indicated by the double arrow in FIGS. 1a, 1b, and 3, it is a question of a bidirectional data transmission between machine control 2 and rotary transducer 1.

The transmitted mode command is decoded in rotary transducer 1, so that the test operation is triggered, which initially results in closing of control elements 1.9, 1.10. Thus, voltage $U_0$ of test-potential source 1.11 is supplied to signal-amplitude monitoring circuit 1.6. The level of voltage $U_0$ is derived from the voltage curve of the corresponding analog position signal (corresponds to the axis of symmetry of the voltage curve of the analog position signal) in accordance with FIG. 2. As illustrated in FIG. 1b, resistors 1.7, 1.8 substantially prevent voltage $U_0$ from being induced in evaluation electronics 1.5. Thus, given a closed control element 1.9, signal-amplitude monitoring circuit 1.6 ascertains that the amplitude of the analog position signal is insufficient and, therefore, outputs an error bit having a changed level. Machine control 2 is programmed such that, during three cycle times, thus, in this case 150 μs, following injection of voltage $U_0$, no reaction (emergency off) is triggered in response to the receipt of an error bit having a changed level.

However, should no level change in the error bit be ascertained by machine control 2, although voltage $U_0$ had been injected, then an error message indicating the same is output. In this manner, it is possible, for example, to test signal-amplitude monitoring circuit 1.6 for correct functioning.

Figure 3:
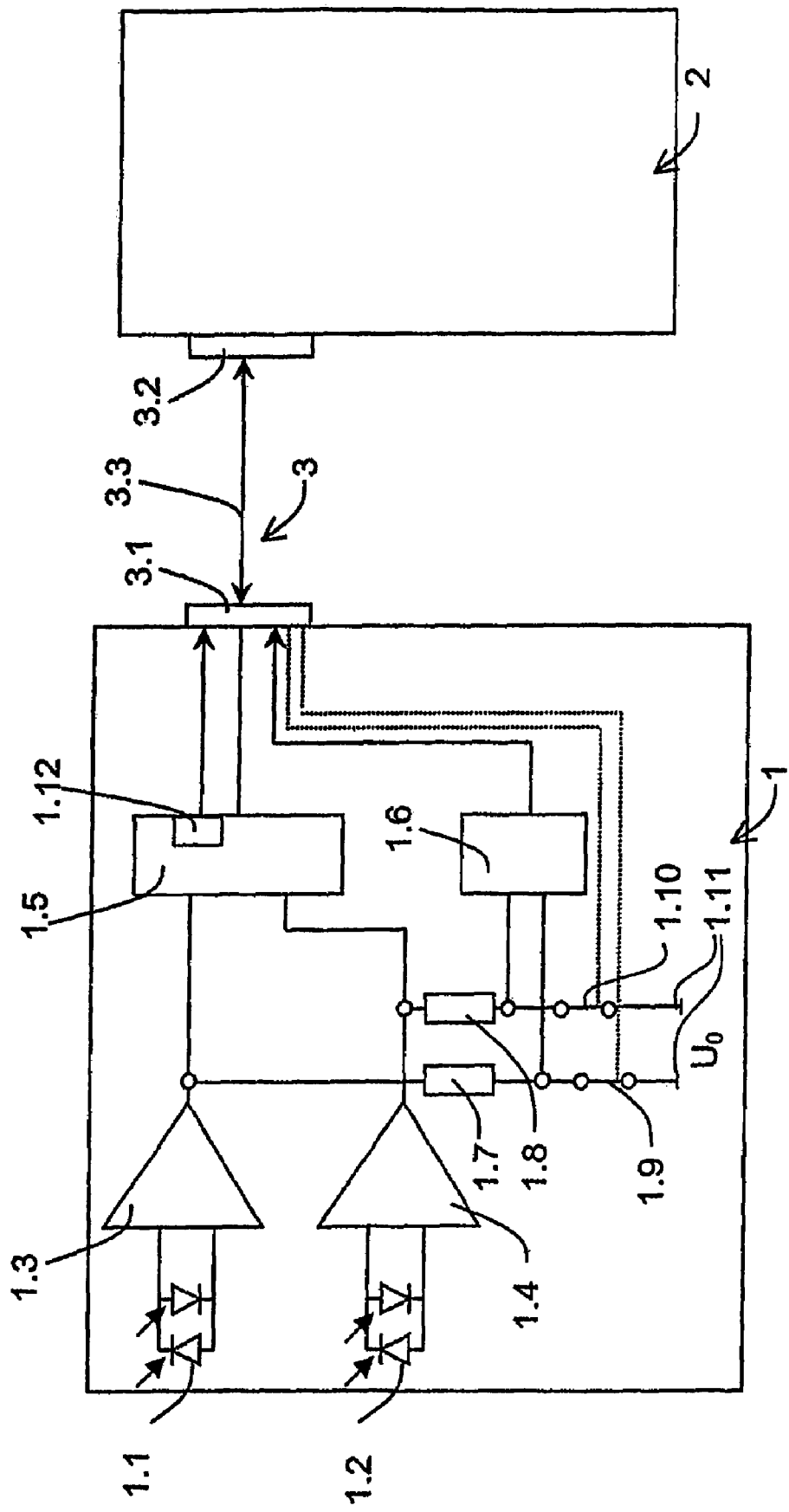
FIG. 3 is a schematic representation of a measuring system according to an example embodiment of the present invention.

In an example embodiment of the present invention, illustrated in FIG. 3, a digital signal-amplitude monitoring circuit 1.12 is additionally integrated in evaluation electronics 1.5. It carries out a plausibility control of the digitized positional data in parallel to signal-amplitude monitoring circuit 1.6. In normal operation, an emergency-off is triggered, as soon as an error bit having a changed level arrives in machine control 2, regardless of whether it comes from signal-amplitude monitoring circuit 1.6 or from digital signal-amplitude monitoring circuit 1.12. An emergency-off also follows when both signal-amplitude monitoring circuits 1.6, as well as digital signal-amplitude monitoring circuit 1.12 signal an error via an error bit having a changed level.

If at this point in test operation, signal-amplitude monitoring circuit 1.6 is tested for correct functioning by applying test potential $U_0$, then machine control 2 may be programmed not to trigger an emergency-off in response to the receipt of an error bit having a changed level from signal-amplitude monitoring circuit 1.6. However, if error bits having a changed level, thus quasi two error messages, from both signal-amplitude monitoring circuit 1.6 and from digital signal-amplitude monitoring circuit 1.12, reach machine control 2 in test operation, then an emergency-off is triggered. In this manner, a sufficient level of reliability may be provided in test operation as well.

It should be understood that the present invention is not limited to measuring systems and methods for monitoring position signals generated by photoelements 1.1, 1.2. Rather, temperature signals, frequency-describing signals, or signals which provide information about the charge condition of batteries, etc., may be considered.

Example embodiments of the present invention may be used for position-measuring devices, which, besides positional data, transmit additional measuring data from other sensors via a shared interface or via the shared data-transmission device 3, bidirectionally between the position-measuring device, in this case rotary transducer 1 and machine control 2. Thus, for example, in addition to positional measurements in rotary transducer 1, speed and/or velocity measurements are also often taken using a Ferraris sensor, for example. The performance reliability of the signal monitoring of these sensors may also be tested using example embodiments of the present invention. The same also applies to rotary transducer 1, in which a temperature-monitoring circuit, for example, for an electromotor, is integrated. The performance reliability of the temperature-signal monitoring may also be tested using example embodiments of the present invention.

What is claimed is:

1. A measuring system, comprising:
   a measurement device configured to output an error bit;
   a second device; and
   a data-transmission device configured to transmit data bits, including the error bit, between the measurement device and the second device;
   wherein the measurement device includes a signal-monitor circuit and a control element, the control element in electrical contact with a test potential source;
   wherein the measurement device is configured to induce a fault in a controlled manner; and
   wherein, in a circuit-element state, the test potential source is in contact with the signal-monitor circuit and the signal-monitor circuit is in contact with the data-transmission device, the second device configured to check whether an error bit having a corresponding level arrives at the second device.

2. The measuring system according to claim 1, wherein the measurement device includes a position-measurement device.

3. The measuring system according to claim 1, wherein the measurement device includes one of (a) a rotary transducer and (b) a linear-measurement device.

4. The measuring system according to claim 1, wherein the second device includes a machine control device.

5. The measuring system according to claim 1, wherein the second device includes a processing machine.

6. A measuring system, comprising:
   measuring means for outputting an error bit;
   second means; and
   data-transmitting means for transmitting data bits, including the error bit, between the measuring means and the second means;
   wherein the measuring means includes signal-monitoring circuit means and control element means, the control element means in electrical contact with a test potential source means;
   wherein the measuring means arranged for inducing a fault in a controlled manner; and
   wherein, in a circuit-element state, the test potential source means is in contact with the signal-monitoring circuit means and the signal-monitoring circuit means is in contact with the data-transmitting means, the second means arranged for checking whether an error bit having a corresponding level arrives at the second means.

* * * * *